(12) United States Patent
Rinard et al.

(10) Patent No.: US 8,612,528 B2
(45) Date of Patent: Dec. 17, 2013

(54) DYNAMIC POPULATION OF NOTIFICATION TEMPLATE WITH LANGUAGE OR TRANSMISSION MODE AT TIME OF TRANSMISSION

(75) Inventors: Ronald Ray Rinard, Woodland Hills, CA (US); Ilana Ochman, Valley Village, CA (US); Aram Edward Pendley, Canoga Park, CA (US)

(73) Assignee: Blackboard Connect Inc., Washington, DC (US)

(*) Notice: Subject to any disclaimer, the term of this patent is extended or adjusted under 35 U.S.C. 154(b) by 145 days.

(21) Appl. No.: 13/173,573

(22) Filed: Jun. 30, 2011

(65) Prior Publication Data
US 2013/0007195 A1    Jan. 3, 2013

(51) Int. Cl.
*G06F 15/16* (2006.01)
(52) U.S. Cl.
USPC ............................................. 709/206
(58) Field of Classification Search
USPC ................................................ 709/206–207
See application file for complete search history.

(56) References Cited

U.S. PATENT DOCUMENTS

| | | | |
|---|---|---|---|
| 6,263,362 B1* | 7/2001 | Donoho et al. | 709/207 |
| 6,751,657 B1* | 6/2004 | Zothner | 709/220 |
| 2010/0169344 A1* | 7/2010 | Ellis et al. | 707/758 |
| 2011/0016050 A1* | 1/2011 | Evans | 705/44 |

OTHER PUBLICATIONS

Oracle, Oracle Fusion Middleware, Nov. 2010, pp. 3-1 to 3-8.*

* cited by examiner

*Primary Examiner* — Lance L Barry
(74) *Attorney, Agent, or Firm* — McDermott Will & Emery LLP

(57) ABSTRACT

Methods for populating a notification template at a time of transmission are provided. In one aspect, a method includes receiving a selection of a notification template, receiving a selection of a parameter associated with the selected notification template, wherein the parameter has associated data, and identifying, at a time of transmission, a subset of the data associated with the selected parameter. The method also includes populating the selected parameter of the selected notification template with the identified subset of the data, and transmitting a notification based on the selected notification template in response to a request to transmit the notification, wherein the notification comprises the parameter populated with the subset of the data. Systems, graphical user interfaces, and machine-readable media are also provided.

12 Claims, 8 Drawing Sheets

DYNAMIC POPULATION OF NOTIFICATION TEMPLATE WITH LANGUAGE OR TRANSMISSION MODE AT TIME OF TRANSMISSION

BACKGROUND

1. Field

The present disclosure generally relates to the transmission of information, and more particularly, to the transmission of notifications over a network.

2. Description of the Related Art

Businesses and governmental entities, including municipalities and schools, are ever more reliant on communicating through the mass transmission of notifications to their staff, citizens, and family members of students to keep these constituencies apprized of important events and emergencies. For example, a school principal might send a notification including a message "School will be closed tomorrow" to the parent of every child at the school because of an unforeseen event such as flooding, fire, or freezing conditions. Notifications with such messages might be sent by telephones, facsimiles, pagers, electronic mail and/or text messages. These notifications will typically vary in their degree of importance, in the number of recipients, or in the immediacy with which they must be sent.

There currently exists a growing problem as mass notification transmission systems become more prevalent. In particular, the number of potential recipients capable of receiving various notifications is consistently increasing, which results in an increasing need to specify notifications to their intended recipients. When the need to transmit notification arises, it is difficult to provide accurate and up-to-date information for the recipient in the notification within the limited period of time often available for sending the notification. For example, if a school district decides in the morning to close all of its schools due to inclement weather, and a notification must be sent within one hour to all parents or guardians of students in the school district, it may be difficult to identify and select every intended recipient within the school district, and provide specific and accurate information for their respective schools within one hour.

SUMMARY

There is a need for a notification system that stores notification templates that can be quickly accessed and used to transmit notifications with information that is accurate and up-to-date for the recipient at the time of transmission. Embodiments of the disclosed methods, systems, and machine-readable storage media address this and other needs.

The present disclosure describes methods, systems, and machine-readable storage media that allow users to quickly generate a notification based on a notification template. The notification can include information individually provided by different users depending on the users' levels of access. When the notification is transmitted, the notification is populated with the most recent information available in the notification system at the time of transmission.

According to one embodiment of the present disclosure, a method for populating a notification template at a time of transmission is disclosed. The method includes receiving a selection of a notification template, receiving a selection of a parameter associated with the selected notification template, wherein the parameter has associated data, and identifying, at a time of transmission, a subset of the data associated with the selected parameter. The method also includes populating the selected parameter of the selected notification template with the identified subset of the data, and transmitting a notification based on the selected notification template in response to a request to transmit the notification, wherein the notification comprises the parameter populated with the subset of the data.

According to another embodiment of the present disclosure, a system for populating a notification template at a time of transmission is disclosed. The system includes a memory including a notification template comprising an associated parameter, and data associated with the parameter. The system also includes a processor. The processor is configured to execute instructions to receive a selection of the notification template, receive a selection of the parameter associated with the selected notification template, and identify, at a time of transmission, a subset of the data associated with the selected parameter. The processor is also configured to populate the selected parameter of the selected notification template with the identified subset of the data, and transmit a notification based on the selected notification template in response to a request to transmit the notification, wherein the notification comprises the parameter populated with the subset of the data.

According to a further embodiment of the present disclosure, a graphical user interface for populating a notification template at a time of transmission is disclosed. The graphical user interface includes a template selection menu for selecting a notification template, and a parameter input menu, associated with the selected notification template, for receiving a parameter associated with the selected notification template. The parameter has associated data. When a notification generated from the selected notification template and the parameter is scheduled to be transmitted, a subset of the data associated with the parameter is populated into the parameter at the time of transmission.

According to yet a further embodiment of the present disclosure, a machine-readable storage medium comprising machine-readable instructions for causing a processor to execute a method for populating a notification template at a time of transmission is disclosed. The method includes receiving a selection of a notification template, receiving a selection of a parameter associated with the selected notification template, wherein the parameter has associated data, and identifying, at a time of transmission, a subset of the data associated with the selected parameter. The method also includes populating the selected parameter of the selected notification template with the identified subset of the data, and transmitting a notification based on the selected notification template in response to a request to transmit the notification, wherein the notification comprises the parameter populated with the subset of the data.

BRIEF DESCRIPTION OF THE DRAWINGS

The accompanying drawings, which are included to provide further understanding and are incorporated in and constitute a part of this specification, illustrate disclosed embodiments and together with the description serve to explain the principles of the disclosed embodiments. In the drawings.

DETAILED DESCRIPTION

In the following detailed description, numerous specific details are set forth to provide a full understanding of the present disclosure. It will be apparent, however, to one ordinarily skilled in the art that the embodiments of the present disclosure may be practiced without some of these specific details. In other instances, well-known structures and techniques have not been shown in detail so as not to obscure the disclosure.

There is a problem in mass notification systems of quickly generating and sending an up-to-date and accurate notification to a group of recipients. This and other problems are addressed and solved, at least in part, by embodiments of the present disclosure which include a system for modifying a notification template based on a user's level of access, and dynamically populating a notification generated from the notification template at the time the notification is transmitted to its recipients.

With reference to the drawings, which are provided by way of exemplification and not limitation, there are disclosed embodiments for disseminating a mass of outgoing digital notifications to recipients by way of various communication methods. More specifically, the notifications are dynamically populated at the time of transmission. As discussed herein, the term "dynamic" reflects the occurrence of an action in real-time or near real-time. Dynamic also refers to the automatic updating of notifications based upon changes in the characteristics of data included or otherwise associated with the notification.

While certain examples are provided herein in the context of an educational institution, the principles of the present disclosure contemplate other types of organizations as well. For example, corporations and governmental entities (e.g., administrative or military) are all considered within the scope of the present disclosure. An institution may also be a consortium of schools and/or campuses. In general terms, an institution is an operating unit and is, itself, possibly made up of different operating units that may correspond to campuses, colleges, departments, sub-departments, etc. The systems and methods described herein do not require any particular arrangement of operating units but, instead, allow the institution to model its organization into a hierarchy of operating units for purposes of management, planning, and reporting.

Figure 1:
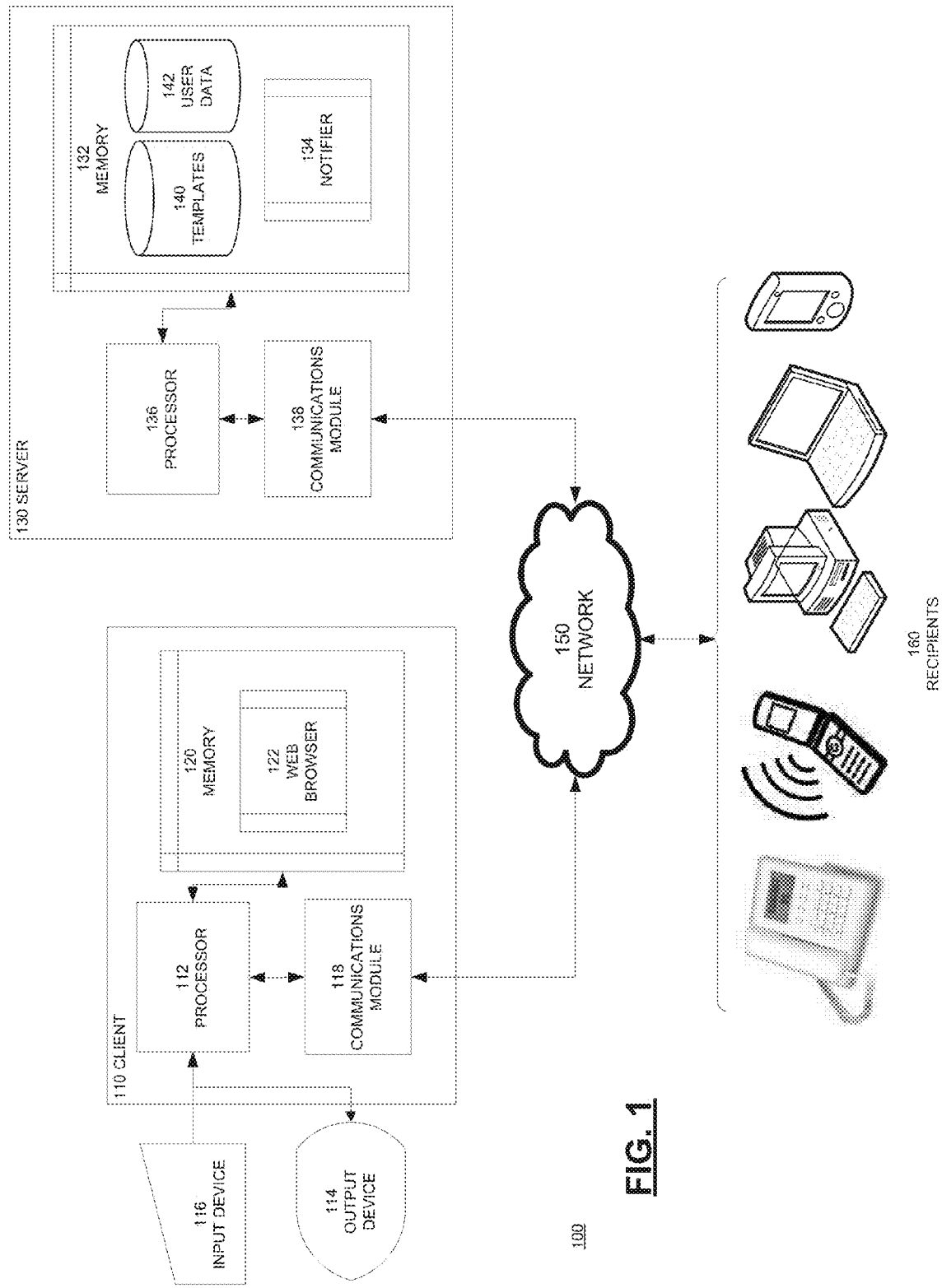
FIG. 1 is a block diagram illustrating an exemplary client and server in an architecture for generating and transmitting notifications according to certain aspects of the disclosure.

FIG. 1 illustrates an exemplary architecture 100 for generating and transmitting notifications according to certain aspects of the disclosure. The architecture includes a client 110 and a mass notification transmission system server 130. The client 110 can be, for example, a desktop computer, a mobile computer, a set top box (for a television), a video game console, a mobile device, or any other device having an appropriate display device 114 and input device 116. As will be discussed in further detail below, a user of the client 110 accesses the server 130 and, using a notification template on the server 130, requests the server 130 to send a notification to one or many recipients. The notification includes data that is provided by one or many users based on their respective levels of access, thereby allowing users to customize the notification for different intended recipients. The notification also includes data that is at least in part automatically populated at the time the notification is transmitted from the server 130, thereby sending the notification with up-to-date data for the recipients.

The client 110 and the server 130 are connected over a network 150 via respective communications modules 118 and 138. The communications modules 118 and 138 are configured to interface with the network 150 to send and receive information, such as data, requests, responses, and commands to other devices on the network. The communications modules 118 and 138 can be, for example, modems or Ethernet cards. The network 150 can include, for example, any one or more of a personal area network (PAN), a local area network (LAN), a campus area network (CAN), a metropolitan area network (MAN), a wide area network (WAN), a broadband network (BBN), the Internet, and the like. Furthermore, the network 150 can include, but is not limited to, any one or more of the following network topologies, including a bus network, a star network, a ring network, a mesh network, a star-bus network, tree or hierarchical network, and the like.

The server 130 includes a processor 136, the communications module 138, and a memory 132 that includes templates data 140, user data 142, and a notifier 134. The templates data 140 includes notification templates and data for populating the notification templates. Specifically, each notification template in the templates data 140 has associated parameters that can be automatically populated b r the server 130 at the time a notification generated from the notification template is transmitted.

The notification template parameters include, for example, a template name field, a template type field (e.g., whether the template is a multi-level shared template, multi-level linked template, single level shared template, or single-level private template), a template class field (e.g., whether the template is for an outreach notification, emergency notification, survey notification, or attendance notification). The parameters also include a template title field, recipient field, geographical location field, notification type field (e.g., text message, telephone call, email, facsimile, page, social network notification, microbiogging publication, feed entry, or Common Alerting Protocol notification), message input field, language field, message sender field, message subject field, and time of transmission field. The data stored in the templates data 140 that is used to populate the notification template parameters include potential template names, template types, template classes, template titles, recipient information, notification types, message text, sender information, message subjects, and times at which to transmit notifications.

The user data 142 in the memory 132 of the server 130 includes information for a user, such as the user's level of access, data generated by the user that is used to populate the template parameters, and the user's associated institution. The user data 142 can include user generated data such as template names, template types, template classes, template titles, recipient information, notification types, message text, sender information, message subjects, and times at which to transmit notifications. A user's level of access can be tied to the user's associated institution. For example, a user that is a district administrator at a district office for a school district can have a higher level of access than users who are teachers at schools within that school district.

The notifier 134 in the memory 132 of the server 130 includes instructions for the processor 136 to generate and send notifications based on the templates data 140 and the user data 142. The processor 136 of the server 130 is configured to execute instructions, such as instructions physically coded into the processor 136, instructions received from software in memory 132 (e.g., the notifier 134), or a combination of both. For example, the processor 136 of the server 130 is configured to execute instructions from the notifier 134 causing it to receive a selection of a notification template (from the templates data 140) from a user of the client 110, and a parameter associated with the selected notification template. The user's selection is received by the server 130 from the client 110. Specifically, the user uses the input device 116 of the client 110 to provide the selections in response to a display of selectable notification templates and any parameters for those notification templates, for example, in a web browser 122 on the output device 114 of the client 110. The user can also select to have a notification generated from the template transmitted immediately, at a later time, and/or on a recurring basis. The selections are transmitted by the communications module 118 of the client 110, over the network 150, and to the communications module 138 of the server 130. Thus, a user can use a web browser 122 on any client 110 to generate and send a notification through the mass notification transmission system server 130.

When the server 130 is ready to transmit a notification based on the user's selected notification template (e.g., after a user has requested the notification be transmitted), the processor 136 of the server 130 identifies a subset of the data associated with the selected parameter with which to populate the selected parameter at the time of transmission (e.g., at the time the processor 136 is preparing the notification for transmission). As a result, the notification is transmitted with information that is up-to-date as of the time of transmission.

For example, if a user of the client 110 selects an attendance notification template and a recipient field of "Anytown District parents and guardians" as the parameter, then the processor 136 of the server 130 will identify, from all of the recipient addresses stored in the templates data 140, the recipient addresses (e.g., telephone numbers, text messaging addresses, or email addresses) for parents in the Anytown District. The processor 136 will then populate the recipient fields with the recipient addresses for parents in the Anytown District. If the user also selected notification type and language as additional parameters, then the processor 136 of the server 130 will identify and populate, from the templates data 140, the notification type with the Anytown District parent recipient's designated notification method (e.g., phone call, text message, or email) and translate the message included in the notification into the recipient's designated language. As another example, if a user of the client 110 selects an emergency notification template and a geographical location field of "Anytown, USA" as the parameter, then the processor 136 of the server 130 will identify from its list of recipients in the templates data 140 those recipients living in Anytown USA. The processor 136 will then populate, from the templates data 140, the geographical location field with recipient addresses (e.g., telephone numbers, text messaging address, or email address) for anyone living in Anytown, USA.

The processor 136 of the server 130 is also configured to execute instructions from the notifier 134 causing it to modify various types of templates stored in the templates data 140 based on user access levels. For instance, templates in the templates data 140 can be multi-level or single level, each of which can be accessed differently based on a user's access level.

Multi-level templates can be linked or shared. Multi-level shared templates can be generated and/or shared by users designated by the server 130 as having higher access levels ("higher level users") with users designated by the server 130 as having lower access levels ("lower level users"). On the other hand, in certain aspects, users at a lowest access level cannot generate and/or share multi-level templates. User access levels, of which there can be an unlimited number, are identified in the user data 142. In certain aspects, when lower level users are associated with institutions that are designated as child institutions of a parent institution associated with a higher level user, then a multi-level shared template can be shared by the higher level user with the lower level user because of the relationship between the parent institution and child institutions. On the other hand, if a lower level user is associated with an institution that is not designated as a child institution of a parent institution associated with a higher level user, then a multi-level shared template cannot be shared by the higher level user with the lower level user.

When a higher level user shares a multi-level shared template with a lower level user, the lower level user can copy the multi-level shared template into their own account (e.g., in the user data 142) and edit the shared template as their own. Thus, if a lower level user modifies a parameter in a multi-level shared template that is shared by a higher level user, then the higher level user will not see the modification. If the higher level user sharing the multi-level shared template later modifies a parameter in that template, then the lower level user will not see the modification. Multi-level shared templates are visible based on the access level of the user. In certain aspects, multi-level shared templates cannot be generated and shared from a lower level user to a higher level user. In certain aspects, multi-level shared templates cannot he generated and shared from a user at one institution to a user at another institution even if the two users have the same access level. Multi-level shared templates are useful in instances where lower level users, such as users at a child institution such as a school, need to use a template generated by a higher level user at a higher institution, such as a district office, but the lower level users need to have their own copy of the multi-level shared template and make their own modifications. Thus, a copy of the multi-level shared template can remain available to any lower level users who modified the multi-level shared template even if the higher level user who generated and/or shared the multi-level shared template attempts to delete the multi-level shared template. In such instances, links between the multi-level shared template shared by the higher level user and the copy of the multi-level shared template modified by the lower level user are deleted.

Unlike multi-level shared templates, multi-level linked templates allow modifications to parameters from a higher level user to be seen by lower level users. Thus, if a higher level user modifies a parameter in a multi-level linked template that is shared with a lower level user, then the lower level user will see the modification. On the other hand, modifications to parameters from lower level users may not be seen by higher level users (e.g., limited to users having the higher level of access). Such parameters may be designated as being modifiable by higher level users, in this regard, the processor 136 of the server 130 is configured to receive a first request, from a first (e.g., higher level) user having a first level of access, to modify a first parameter from a first state to a second state in a multi-level linked template, and receive a second request, from a second (e.g., lower level) user having a second level of access, to modify a second parameter in the multi-level linked template from a first state to a second state, and then store the modified notification template in the templates data 140 in memory 132. When the processor 136 retrieves the modified multi-level linked template from the memory 132, the first parameter is in the second state for both the first user and the second user, and the second parameter is in the first state for the first user and the second state for the second user. When the processor 136 receives a third request, from a third user having the same lower level of access as the second user, to modify the second parameter in the multi-level linked template from the first state to a third state, then when processor 136 retrieves the modified notification template from memory 132, the second parameter is in the third state for the third user.

Higher level users can generate and/or share multi-level linked templates with lower level users so that the lower level users can edit the content of the message being delivered in a notification based on the shared and linked template, while allowing a higher level user to initiate the sending of the notification. Higher level users can also stop the transmission of notifications based on multi-level linked notification templates generated by the higher level users but designated for transmission by lower lever users. If a higher level user changes a parameter or attempts to delete the multi-level shared template or a notification generated from the multi-level shared template, then the server 130 can warn the higher level user and any lower level users of the impact of the modification or deletion on other users or notifications. Specifically, the processor 136 is configured to execute instructions from the notifier 134 to transmit a message indicating a modification of a parameter to a lower level user when a request to modify the parameter is received from a higher level user.

With multi-level linked templates, the processor 136 is configured to receive a request from a first (e.g., higher level) user to modify a first parameter from a first state to a second state in the multi-level linked template, receive a request from a second (e.g., lower lever user to modify the first parameter in the multi-level linked template from a first state to a third state, and receive a request from a third user having a third level of access (e.g., which may be different than the second user) to modify the first parameter in the other notification template from a first state to a fourth state. When the processor 136 retrieves the modified multi-level linked template from memory 132, the first parameter is in the second state for the first user, the third state for the second user, and the fourth state for the third user.

Multi-level linked templates are useful in situations where, before a notification generated from the multi-level linked template is transmitted, higher level users have lower level users modify parameters in the notification template based on the lower level users' needs. For example, a higher level user at a county administrator office has generated a multi-level linked template for placing an automated phone call regarding an upcoming storm. The higher level user then shares the multi-level linked template with lower level users at city administrator offices within the county so that the lower level users can modify a parameter within the multi-level linked template (e.g., by uploading their own audio messages) with information specific to their city's impact from the storm. When the higher level user at the county administrator office decides to send a notification based on the multi-level linked template, the notification will be sent to all residents in the country with information specific to the city in which they live.

In certain aspects, a multi-level notification template can be designated to "cascade" by a higher level user. When a multi-level notification template is cascaded, the multi-level notification template will be copied for each lower level user who receives access to the multi-level notification template, and can then be separately scheduled for delivery by the lower level user. The delivery scheduling of the multi-level notification template may be designated by a user at the same institution as the lower level user who received access to the multi-level notification template.

Single level templates can be shared or private. Single level shared templates can be shared between users within the same institution (e.g., they are limited in access to users in the same institution and having appropriate access privileges). This is useful, for example, where a teacher at school 'A' within a school district wants to share a template the teacher generated with another teacher at the same school. Unlike single level shared templates, single level private templates are not shared between users (e.g., they are limited in access to the user that generates the template). This is useful where users want to generate templates for their own use. In certain aspects, single level shared templates can also be shared between users having the same level of access (e.g., they are limited in access to users having the same level of access).

Figure 2:
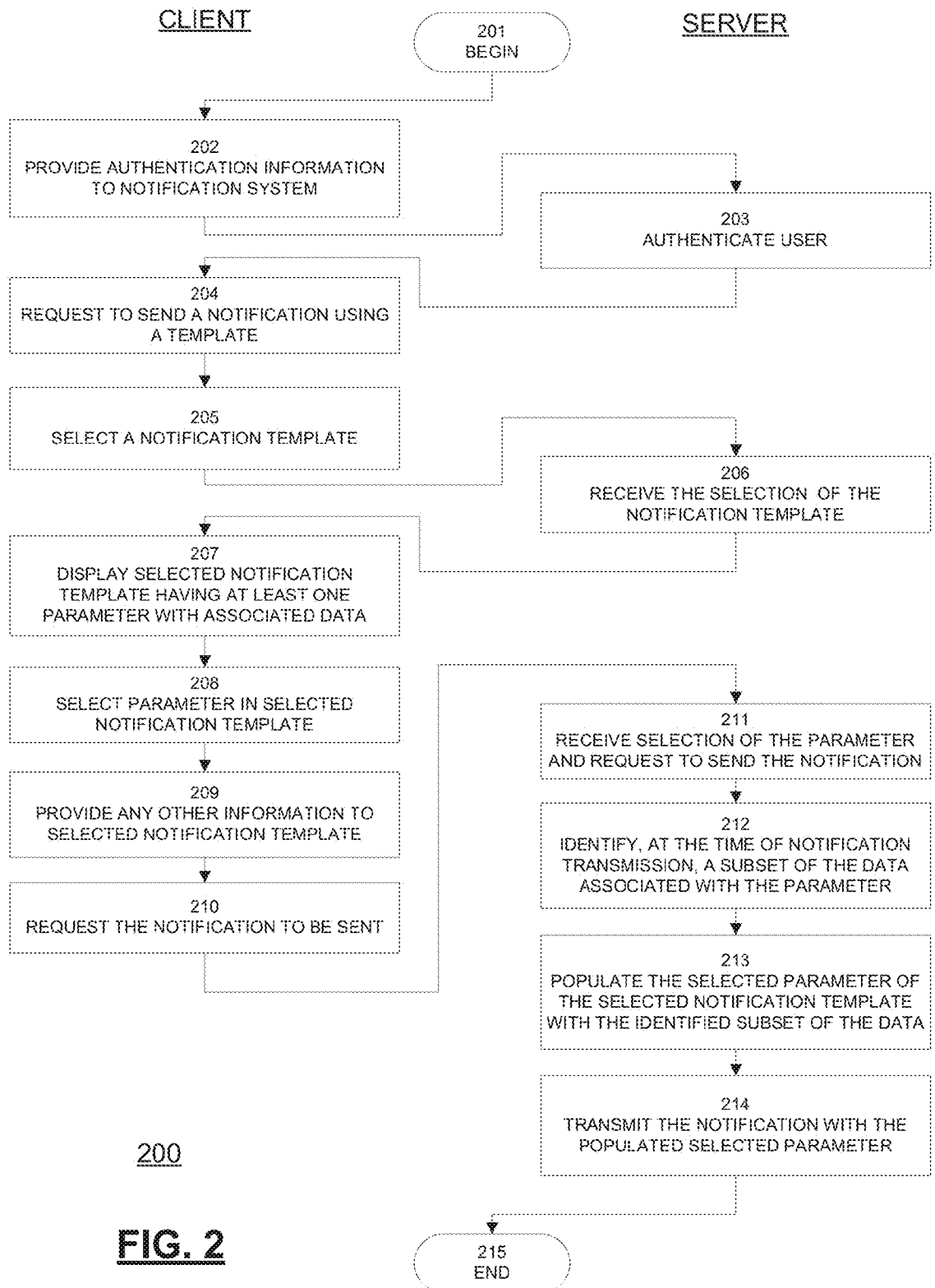
FIG. 2 illustrates an exemplary process for populating a notification template at a time of transmission using the exemplary client and server of FIG. 1.

FIG. 2 illustrates an exemplary process for populating a notification template at a time of transmission using the exemplary client 110 and server 130 of FIG. 1. The process 200 begins by proceeding from beginning step 201 when a user loads a web page for accessing the notifier 134, which represents the mass notification transmission system, in the web browser 1122 of the client 110. In step 202, the user provides authentication information for accessing the mass notification transmission system, which is received and authenticated by the server 130 in step 203. In step 204, the user, using the web browser 122 at the client 110, requests to send a notification using a notification template in step 204, and selects the notification template in step 205. In step 206, the server 130 receives the user's selection of the notification template.

In step 207, the selected notification template is displayed in the web browser 122 of the client 110 in response to being provided from the templates data 140 of the server 130. The notification template includes at least one parameter that has associated data. The user selects a parameter from the selected notification template in step 208, provides any other information for the selected notification template (e.g., to complete it) in step 209, and requests a notification generated from the selected notification template to be sent by the server 130 in step 210.

In step 211, the server 130 receives the selection of the parameter and the request to send the notification. At about the time the notification is designated to be transmitted, the server 130 identifies a subset of the data associated with the parameter in step 212 from the templates data 140, and in step 213 populates the selected parameter of the notification template with the identified subset of the data. In step 214, the notification template, having been populated based on step 213, is used to generate a notification that is transmitted by the server 130, and the process 200 ends in step 215.

Figure 3A:
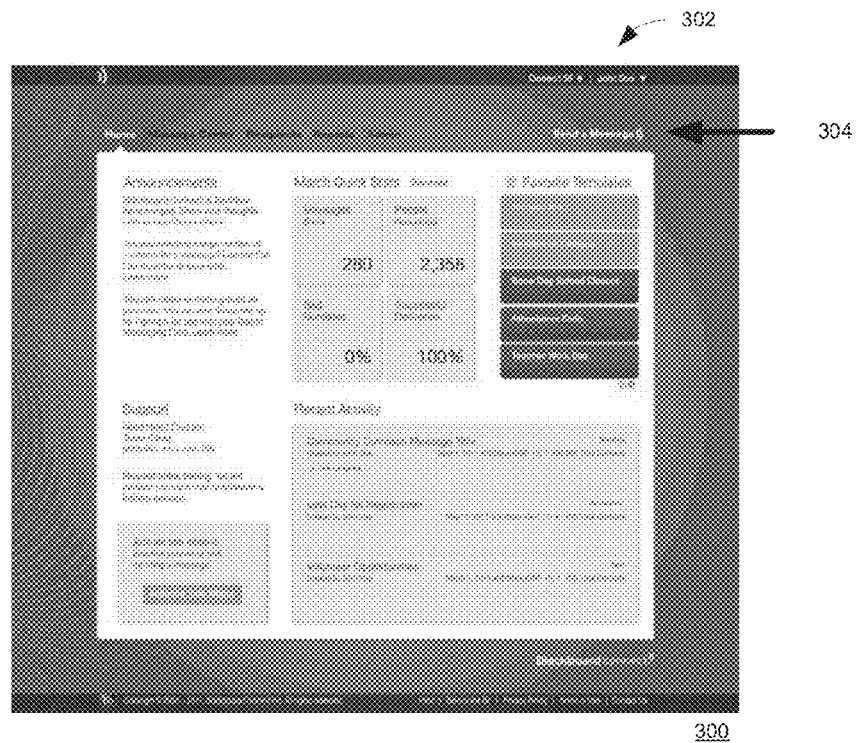
FIGS. 3A-3E are exemplary screenshots associated with the exemplary process of FIG. 2.

FIG. 2 sets forth an exemplary process 200 for populating a notification template at a time of transmission using the exemplary client 110 and server 130 of FIG. 1. An example will now be described using the exemplary process 200 of FIG. 2, an emergency notification template, and a city fire marshal as the user. The process 200 begins by proceeding from beginning step 201 when the fire marshal loads an access web page for the notifier 134, which represents the mass notification transmission system, in the web browser 122 of the client 110. In step 202, the fire marshal provides authentication information for accessing the mass notification transmission system. The authentication information is received and authenticated by the server 130 in step 203. An exemplary screenshot 300 of the access web page is shown in FIG. 3A. The screenshot 300 includes an identification 302 of the authenticated fire marshal. In step 204, the fire marshal requests to send a notification using a notification template in step 204 by pressing the "Send a Message" link 304 in the web page.

Figure 3B:
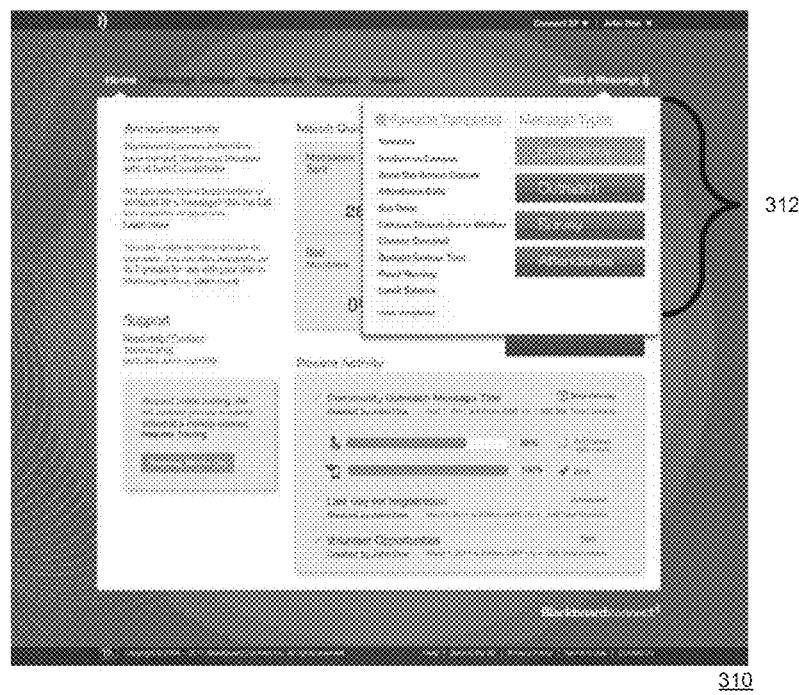
Figure 3C:
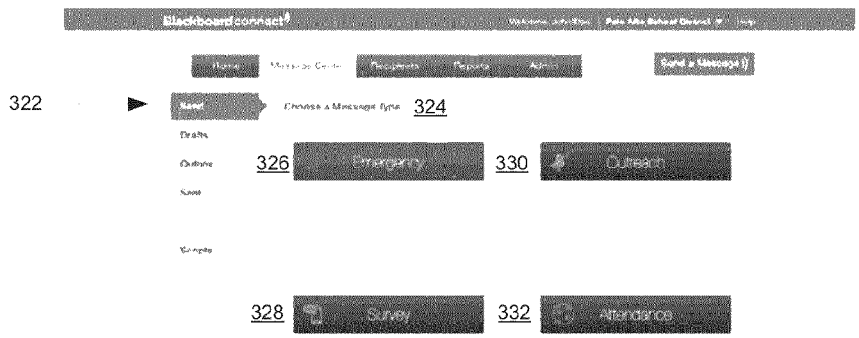
Figure 3D:
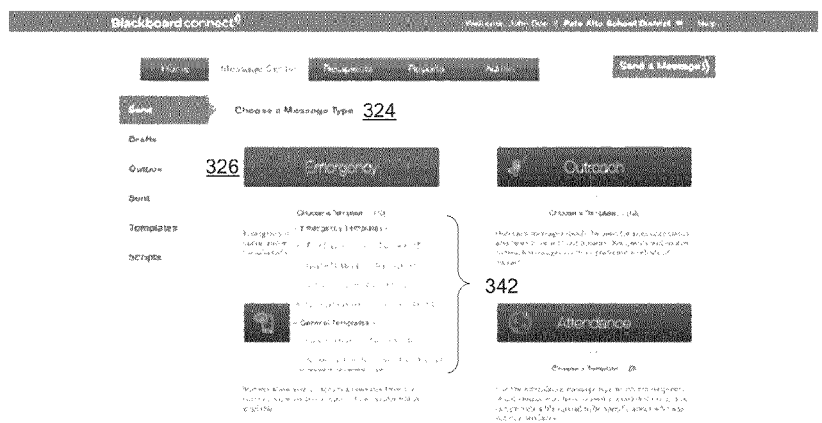
Figure 3E:
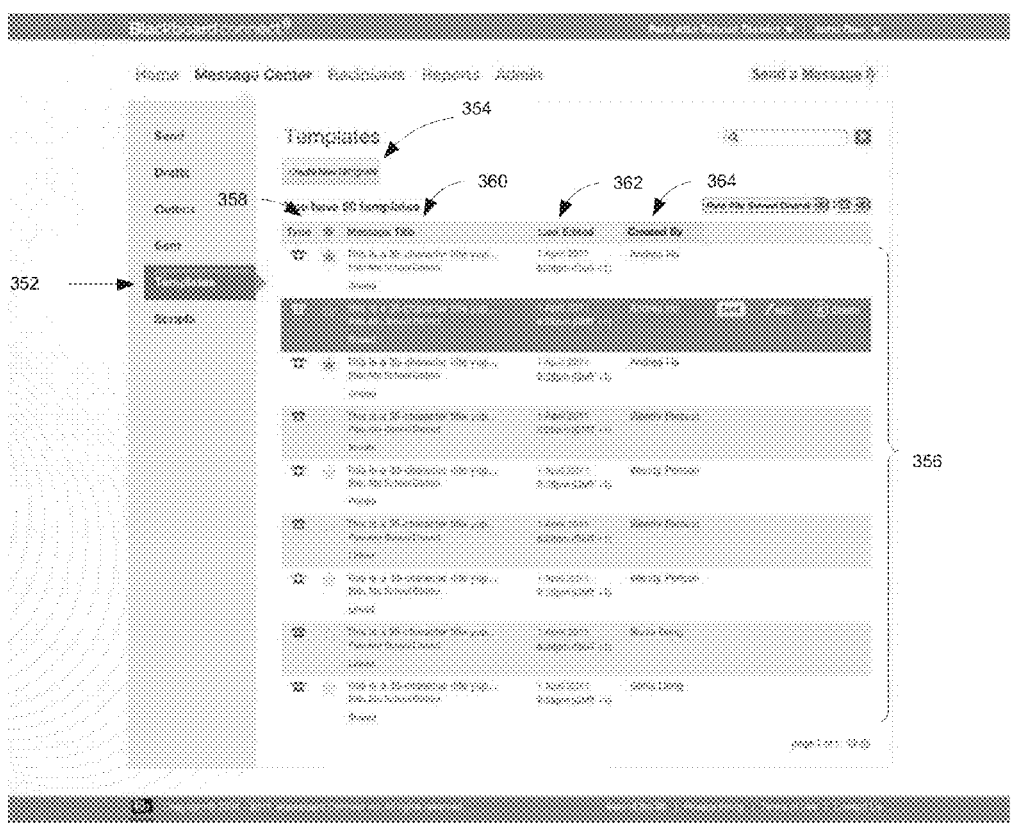

In step 205, the fire marshal selects an emergency notification template. FIGS. 3B-3E are exemplary screenshots of ways for the fire marshal to select a notification template. In FIG. 3B, the fire marshal can select the emergency notification template using a drop down menu 312 from the web page illustrated in the screenshot 300 of FIG. 3A. In the exemplary screenshot 320 of FIG. 3C, the fire marshal selects the emergency notification template by entering the message center portion of the web interface for the mass notification transmission system, choosing the send submenu 322, and selecting the emergency notification template 326 from among the displayed notification templates 324. The displayed notification templates include the emergency notification template 326, a survey notification template 328, an outreach notification template 330, and an attendance notification template 332. When the fire marshal selects the emergency notification template 326, a submenu 342 of specific emergency notification templates is displayed for selection, as illustrated in the exemplary screenshot 340 of FIG. 3D. FIG. 3E is an exemplary screenshot 350 of the web interface for the mass notification transmission system illustrating a third way to select the emergency notification template. In FIG. 3E, the fire marshal selects the emergency notification template by entering the message center portion of the web interface for the mass notification transmission system, choosing the templates submenu 352, and selecting from one of many displayed templates 356. The displayed templates include information on the notification template type 358, message title 360, time of last edit 362, creator and 364. The fire marshal also has the option to create a new notification template 354.

After the fire marshal has selected the emergency notification template in step 205 in FIG. 2, the server 130 in step 206 receives the fire marshal's selection of the emergency notification template. In step 207, the selected emergency notification template is displayed in the web browser 122 of the client 110 in response to being provided from the templates data 140 of the server 130. The emergency notification template includes several parameters that have associated data, including geographical location field, notification type field, and language field. These parameters are selected by the fire marshal in step 208 for automatic population at the time of transmission. In step 209, the fire marshal enters data for other parameters displayed in the emergency notification template, including the text "Fire Alert" in the template title field and the text "Due to a fire emergency, please be on alert for immediate evacuation" in the message input field. The fire marshal requests a notification generated from the selected emergency notification template be sent by the server 130 in step 210.

In step 211, the server 130 receives the selection of the geographical location field, notification type field, and language field parameters, the input text, and the request to send the notification. At about the time the notification is designated to be transmitted, the notifier 134 identifies city residents living within the selected geographical location, their preferred notification methods (e.g., phone call or text message), and their preferred language of communication, from the templates data 140. In step 213, the notifier 134 populates the selected geographical location field, notification type field, and language field parameters in the emergency notification template with the identified residents' information, and generates a notification from the populated emergency notification template for transmission In step 214, the emergency notification is transmitted by the server 130, and the process 200 ends in step 215. Thus, all of the residents within the geographical region affected by the fire will receive a notification based on their most recent language preference and preferred type of communication.

Figure 4:
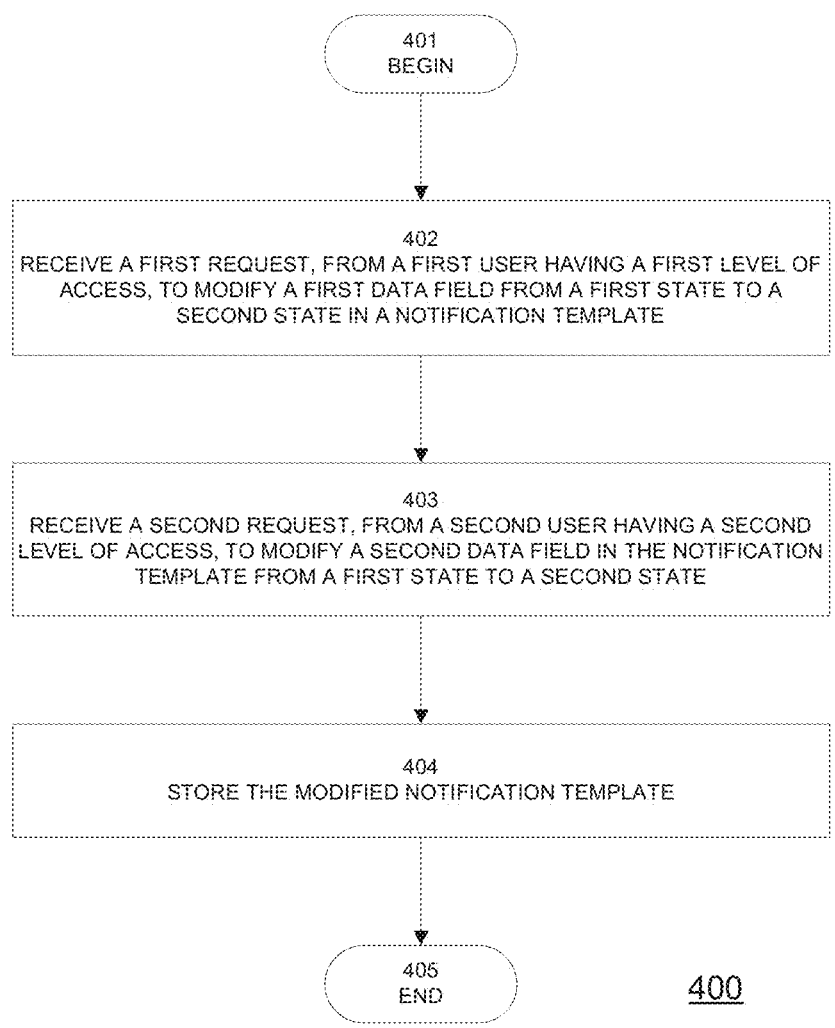
FIG. 4 illustrates an exemplary process for modifying a notification based on user access levels using the exemplary client and server of FIG. 1.

FIG. 4 is an exemplary process 400 for modifying a notification based on user access levels using the exemplary client 110 and server 130 of FIG. 1. The process 400 begins by proceeding from beginning step 401 when at least two users, a first user and a second user, either simultaneously or serially access the mass notification transmission system server 130 using respective web browsers 122 of their clients 110, and request to change the same notification template. In step 402, the notifier 134 on the server 130 receives a first request, from the first user, to modify a first data field from a first state to a second state in the notification template stored in the templates data 140. The first user has a first level of access. In step 403, the server 130 receives a second request, from the second user, to modify a second data field in the notification template from a first state to a second state. The second user has a second level of access. In step 404, the modified notification template is stored in the templates data 140 in the memory 132 of the server 130. When the modified notification template is later retrieved from storage, the first parameter will be in the second state for both the first user and the second user, and the second parameter will be in the first state for the first user and the second state for the second user. In other words, the change made by the first user wilt be visible to both the first user and the second user, but the change made by the second user will be visible to the second user but not to the first user. In certain aspects, the change to the second parameter made by the second user can be seen by the first user, but does not otherwise affect any data entered by the first user into the second parameter.

Figure 5:
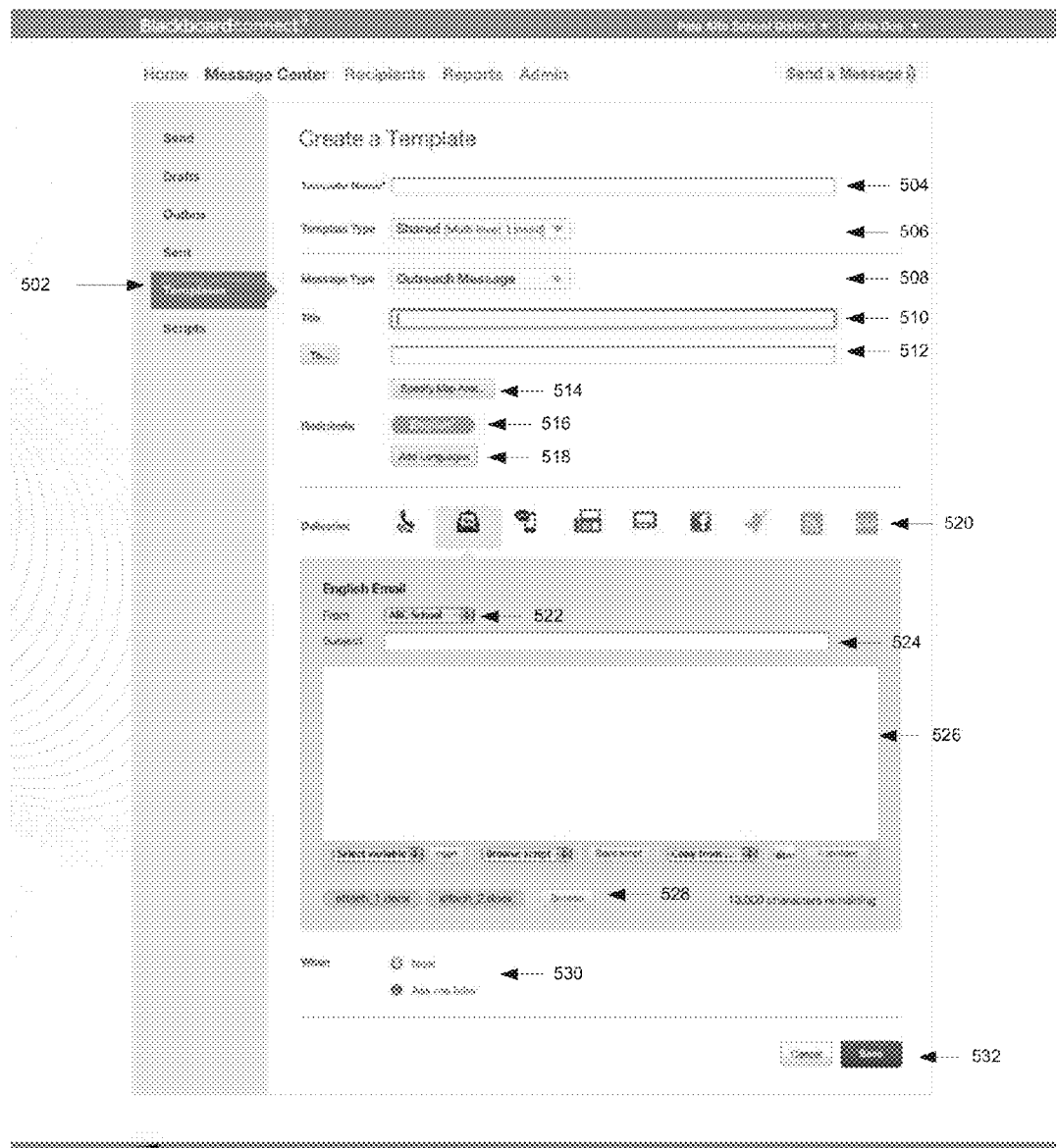
FIG. 5 is an exemplary screenshot associated with the exemplary process of FIG. 4.

FIG. 4 sets forth an exemplary process 400 for modifying a notification based on user access levels using the exemplary client 110 and server 130 of FIG. 1. An example will now be described using the exemplary process 400 of FIG. 4, an outreach notification template, a first user who is a county administrator with a high level of access, and a second user who is a teacher with a low level of access. The process 400 begins by proceeding from beginning step 401 when the county administrator decides to send an outreach notification to all parents and guardians of students in the county regarding a change in an education requirement for math. The county administrator has loaded a new outreach notification template in a web browser 122 on a desktop computer 110, as illustrated by the exemplary screenshot 500 of FIG. 5. The new outreach notification template can, for example, be loaded by accessing the "Templates" section 502 of the user interface or by pressing the "Create New Template" button 354 illustrated in the exemplary screenshot 350 of FIG. 3E.

In step 402, the notifier 134 on the server 130 receives a request from the administrator to enter static text into the template name 504 (e.g., "New Requirement Template") and message title 510 (e.g., "New Math Requirement for Students") fields, which are parameters in the outreach notification template. The server 130 also receives static selections from the country administrator in the template type field 506 (e.g., "Multi-Level Linked") and message type 508 (e.g., "Outreach Message"). The server 130 further receives dynamic selections from the country administrator in the recipient field 512 (e.g., "parents and guardians of students with the county"), geographic region field 514 (e.g., the county), languages fields 516 and 518 (e.g., English and recipient's (preferred language, if any), and notification type field 520 (e.g., email and recipient's preferred notification type, if any). These fields are dynamically (e.g., automatically) populated with up-to-date data by the notifier 134 at the time the notification is transmitted, as discussed above with reference to process 200 of FIG. 2. The server 130 yet further receives a designation from the county administrator to save 532 the notification template for later delivery 530. Because the notification is selected by the county administrator to be a multi-level linked template 506, the data provided by the notification into the fields discussed above 504, 506, 508, 510, 512, 514, 516, 518, 520, 530, and 532 will remain the same for all lower level users that the county administrator shares the notification template with, including the teacher, but allows the lower level access users, such as the teacher, to provide their own data into the remaining fields 522, 524, 526, and 528.

In step 403, the server 130 receives a request from the teacher to input data into the remaining fields 522, 524, 526, and 528. Specifically, the teacher designates the teacher's school in the sender field 522, a subject 524 "Message from your child's math teacher"), and a message in the message field 526 (e.g., "Our school has new math requirements for your student. Please contact me directly."). The teacher does not select to provide any attachments 528.

In step 404, after both the county administrator and the teacher have entered data, the modified outreach notification template is saved in the templates data 140 in the memory 132 of the server 130. When the county administrator decides to send the notification (e.g., after any lower level access teachers have provided their input specific to the student), the notification will be sent with input in corresponding fields from both the county administrator and the teacher.

Figure 6:
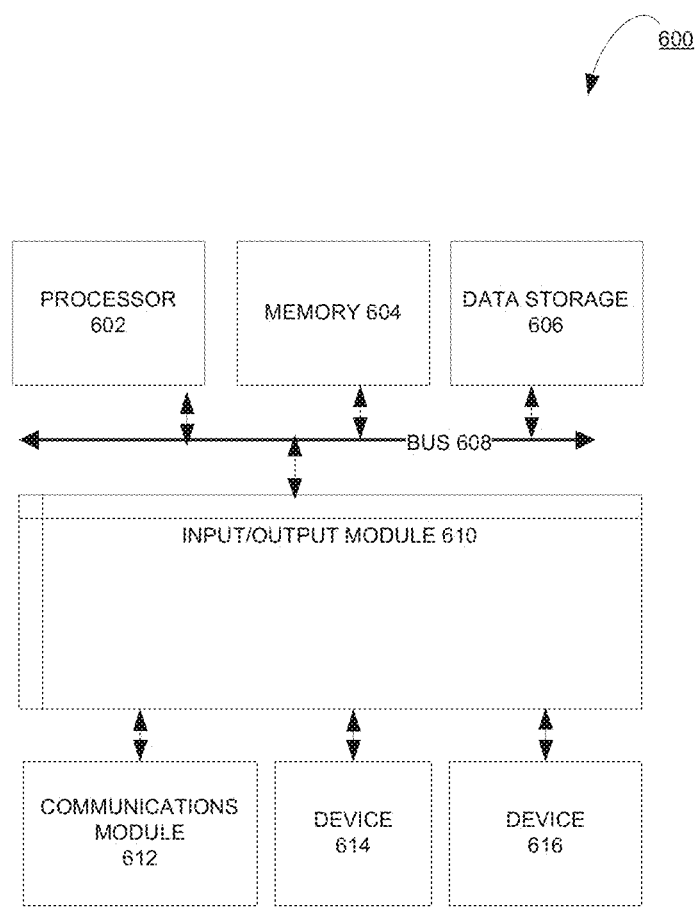
FIG. 6 is a block diagram illustrating an exemplary computer system with which the client and server of FIG. 1 can be implemented.

FIG. 6 is a block diagram illustrating an exemplary computer system 600 with which the client 110 and server 130 of FIG. 1 can be implemented. In certain aspects, the computer system 600 may be implemented using hardware or a combination of software and hardware, either in a dedicated server, or integrated into another entity, or distributed across multiple entities.

Computer system 600 (e.g., client 110 and server 130) includes a bus 608 or other communication mechanism for communicating information, and a processor 602 (e.g., processor 112 and 136) coupled with bus 608 for processing information. By way of example, the computer system 600 may be implemented with one or more processors 602. Processor 602 may be a general-purpose microprocessor, a microcontroller, Digital Signal Processor (DSP), an Application Specific Integrated Circuit (ASIC), a Field Programmable Gate Array (FPGA), a Programmable Logic Device (PLD), a controller, a state machine, gated logic, discrete hardware components, or any other suitable entity that can perform calculations or other manipulations of information.

Computer system 600 can include, in addition to hardware, code that creates an execution environment for the computer program in question, e.g., code that constitutes processor firmware, a protocol stack, a database management system, an operating system, or a combination of one or more of them stored in an included memory 604 (e.g., memory 120 and 132), such as a Random Access Memory (RAM), a flash memory, a Read Only Memory (ROM), a Programmable Read-Only Memory (PROM), an Erasable PROM (EPROM), registers, a hard disk, a removable disk, a CD-ROM, a DVD, or any other suitable storage device, coupled to bus 608 for storing information and instructions to be executed by processor 602. The processor 602 and the memory 604 can be supplemented by, or incorporated in, special purpose logic circuitry.

The instructions may be stored in the memory 604 and implemented in one or more computer program products, i.e., one or more modules of computer program instructions encoded on a computer readable medium for execution by, or to control the operation of, the computer system 600, and according to any method well known to those of skill in the art, including, but not limited to, computer languages such as data-oriented languages (e.g., SQL, dBase, system languages (e.g., C, Objective-C, C++, Assembly), architectural languages (e.g., Java, .NET), and application languages (e.g., PHP, Ruby, Peri, Python). Instructions may also be implemented in computer languages such as array languages, aspect-oriented languages, assembly languages, authoring languages, command line interface languages, compiled languages, concurrent languages, curly-bracket languages, dataflow languages, data-structured languages, declarative languages, esoteric languages, extension languages, fourth-generation languages, functional languages, interactive mode languages, interpreted languages, iterative languages, list-based languages, little languages, logic-based languages, machine languages, macro languages, metaprogramming languages, muitiparadigm languages, numerical analysis, non-English-based languages, object-oriented class-based languages, object-oriented prototype-based languages, offside rule languages, procedural languages, reflective languages, rule-based languages, scripting languages, stack-based languages, synchronous languages, syntax handling languages, visual languages, wth languages, and xml-based languages. Memory 604 may also be used for storing temporary variable or other intermediate information during execution of instructions to be executed by processor 602.

A computer program as discussed herein does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, subprograms, or portions of code). A computer program can be deployed to be executed on one computer or on multiple computers that are located at one site or distributed across multiple sites and interconnected by a communication network. The processes and logic flows described in this specification can be performed by one or more programmable processors executing one or more computer programs to perform functions by operating on input data and generating output.

Computer system 600 further includes a data storage device 606 such as a magnetic disk or optical disk, coupled to bus 608 for storing information and instructions. Computer system 600 may be coupled via input/output module 610 to various devices. The input/output module 610 can be any input/output module. Exemplary input/output modules 610 include data ports such as USB ports. The input/output module 610 is configured to connect to a communications module 612. Exemplary communications modules 612 (e,g, communications module 118 and 138) include networking interface cards, such as Ethernet cards and modems. In certain aspects, the input/output module 610 is configured to connect to a plurality of devices, such as an input device 614 (e.g., input device 116) and/or an output device 616 (e.g., output device 114). Exemplary input devices 614 include a keyboard and a pointing device, e.g., a mouse or a trackball, by which a user can provide input to the computer system 600. Other kinds of input devices 614 can be used to provide for interaction with a user as well, such as a tactile input device, visual input device, audio input device, or brain-computer interface device. For example, feedback provided to the user can be any form of sensory feedback, e.g., visual feedback, auditory feedback, or tactile feedback; and input from the user can be received in any form, including acoustic, speech, tactile, or brain wave input. Exemplary output devices 616 include display devices, such as a CRT (cathode ray tube) or LCD (liquid crystal display) monitor, for displaying information to the user.

According to one aspect of the present disclosure, the clients 110a and 110b and servers 130a, 130b, and 130c can be implemented using a computer system 600 in response to processor 602 executing one or more sequences of one or more instructions contained in memory 604. Such instructions may be read into memory 604 from another machine-readable medium, such as data storage device 606. Execution of the sequences of instructions contained in main memory 604 causes processor 602 to perform the process steps described herein. One or more processors in a multi-processing arrangement may also be employed to execute the sequences of instructions contained in memory 604. In alternative aspects, hard-wired circuitry may be used in place of or in combination with software instructions to implement various aspects of the present disclosure. Thus, aspects of the present disclosure are not limited to any specific combination of hardware circuitry and software.

Various aspects of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. The connection network (e.g., network 150) can include, for example, any one or more of a personal area network (PAN), a local area network (LAN), a campus area network (CAN), a metropolitan area network (MAN), a wide area network (WAN), a broadband network (BBN), the Internet, and the like. Further, the communication network can include, but is not limited to, for example, any one or more of the following network topologies, including a bus network, a star network, a ring network, a mesh network, a star-bus network, tree or hierarchical network, or the like. The communications modules can be, for example, modems or Ethernet cards.

Computing system 600 can include clients and servers. A client and server are generally remote from each other and typically interact through a communication network. The relationship of client and server arises by virtue of computer programs running on the respective computers and having a client server relationship to each other. Computer system 600 can be, for example, and without limitation, a desktop computer, laptop computer, or tablet computer. Computer system 600 can also be embedded in another device, for example, and without limitation, a mobile telephone, a personal digital assistant (PDA), a mobile audio player, a Global Positioning System (GPS) receiver, a video game console, and/or a television set top box, The term "machine-readable storage medium" or "computer readable medium" as used herein refers to any medium or media that participates in providing instructions to processor 602 for execution. Such a medium may take many forms, including, but not limited to, non-volatile media, volatile media, and transmission media. Non-volatile media include, for example, optical or magnetic disks, such as data storage device 606. Volatile media include dynamic memory, such as memory 604. Transmission media include coaxial cables, copper wire, and fiber optics, including the wires that comprise bus 608. Common forms of machine-readable media include, for example, floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH EPROM, any other memory chip or cartridge, or any other medium from which a computer can read. The machine-readable storage medium can be a machine-readable storage device, a machine-readable storage substrate, a memory device, a composition of matter effecting a machine-readable propagated signal, or a combination of one or more of them.

Systems, methods, and machine-readable media for providing notifications, based on notification templates modifiable by users having different levels of access and automatically populated at the time of transmission, have been described. The notifications, which are sent to large numbers of recipients, are generated based on the notification templates. The notification templates have parameters that can be designated for modification by users based on the users' respective levels of access. A higher level user can set permissions on which parameters lower level users can modify, thereby allowing lower level users to modify parameters to provide information specific to the lower level user and/or the notification recipients. When the notification is ready to be transmitted, parameters in the notification template can be automatically updated with the most up-to-date information for the recipients, such as the recipient's address and preferred contact method.

While this specification contains many specifics, these should not be construed as limitations on the scope of what may be claimed, but rather as descriptions of particular implementations of the subject matter. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the aspects described above should not be understood as requiring such separation in all aspects, and it should be understood that the described program components and systems can generally be integrated together in a single software product or packaged into multiple software products.

The subject matter of this specification has been described in terms of particular aspects, but other aspects can be implemented and are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous. Other variations are within the scope of the following claims.

These and other implementations are within the scope of the following claims.

What is claimed is:

1. A method for populating a notification template at a time of transmission comprising:
receiving a selection of a notification template;
receiving a selection of a parameter associated with the selected notification template, wherein the parameter has associated data;
identifying, at a time of transmission and using a processor, a subset of the data associated with the selected parameter;
populating the selected parameter of the selected notification template with the identified subset of the data; and
transmitting a notification based on the selected notification template in response to a request to transmit the notification, wherein the notification comprises the parameter populated with the subset of the data,
wherein the parameter comprises a recipient, the data comprises a plurality of modes of transmitting the notification, and the subset of the data comprises a selected mode of transmitting the notification, from the plurality of modes of transmitting the notification, identified for the recipient.

2. The method of claim 1, wherein the parameter comprises a recipient identifier, the data comprises a group of recipients, and the subset of the data comprises recipients, from the group of recipients, matching the recipient identifier.

3. The method of claim 1, wherein the parameter comprises a geographical region, the data comprises a plurality of recipients, and the subset of the data comprises a subset of the recipients identified as located within the geographical region.

4. The method of claim 1, wherein the notification is scheduled to be transmitted periodically.

5. A method for populating a notification template at a time of transmission comprising:
receiving a selection of a notification template;
receiving a selection of a parameter associated with the selected notification template, wherein the parameter has associated data;
identifying, at a time of transmission and using a processor, a subset of the data associated with the selected parameter;
populating the selected parameter of the selected notification template with the identified subset of the data; and
transmitting a notification based on the selected notification template in response to a request to transmit the notification, wherein the notification comprises the parameter populated with the subset of the data,
wherein the notification comprises a message, the parameter comprises a recipient, the data comprises a plurality of languages, and the subset of the data comprises a selected language for the message identified for the recipient.

6. A system for populating a notification template at a time of transmission, the system comprising:
a memory comprising:
a notification template comprising an associated parameter; and
data associated with the parameter;
a processor configured to execute instructions to:
receive a selection of the notification template;
receive a selection of the parameter associated with the selected notification template;
identify, at a time of transmission, a subset of the data associated with the selected parameter;
populate the selected parameter of the selected notification template with the identified subset of the data; and
transmit a notification based on the selected notification template in response to a request to transmit the notification, wherein the notification comprises the parameter populated with the subset of the data,
wherein the parameter comprises a recipient, the data comprises a plurality of modes of transmitting the notification, and the subset of the data comprises a selected mode of transmitting the notification, from the plurality of modes of transmitting the notification, identified for the recipient.

7. The system of claim 6, wherein the parameter comprises a recipient identifier, the data comprises a group of recipients, and the subset of the data comprises recipients, from the group of recipients, matching the recipient identifier.

8. The system of claim 6, wherein the parameter comprises a geographical region, the data comprises a plurality of recipients, and the subset of the data comprises a subset of the recipients identified as located within the geographical region.

9. The system of claim 6, wherein the notification is scheduled to be transmitted periodically.

10. A system for populating a notification template at a time of transmission, the system comprising:
a memory comprising:
a notification template comprising an associated parameter; and
data associated with the parameter;
a processor configured to execute instructions to:
receive a selection of the notification template;
receive a selection of the parameter associated with the selected notification template;
identify, at a time of transmission, a subset of the data associated with the selected parameter;
populate the selected parameter of the selected notification template with the identified subset of the data; and
transmit a notification based on the selected notification template in response to a request to transmit the notification, wherein the notification comprises the parameter populated with the subset of the data,
wherein the notification comprises a message, the parameter comprises a recipient, the data comprises a plurality of languages, and the subset of the data comprises a selected language for the message identified for the recipient.

11. A non-transitory machine-readable storage medium comprising machine-readable instructions for causing a processor to execute a method for populating a notification template at a time of transmission, comprising:
receiving a selection of a notification template;
receiving a selection of a parameter associated with the selected notification template, wherein the parameter has associated data;
identifying, at a time of transmission, a subset of the data associated with the selected parameter;
populating the selected parameter of the selected notification template with the identified subset of the data; and
transmitting a notification based on the selected notification template in response to a request to transmit the notification, wherein the notification comprises the parameter populated with the subset of the data, wherein the parameter comprises a recipient, the data comprises a plurality of modes of transmitting the notification, and the subset of the data comprises a selected mode of transmitting the notification, from the plurality of modes of transmitting the notification, identified for the recipient.

12. A non-transitory machine-readable storage medium comprising machine-readable instructions for causing a processor to execute a method for populating a notification template at a time of transmission, comprising:

receiving a selection of a notification template;

receiving a selection of a parameter associated with the selected notification template, wherein the parameter has associated data;

identifying, at a time of transmission, a subset of the data associated with the selected parameter;

populating the selected parameter of the selected notification template with the identified subset of the data; and transmitting a notification based on the selected notification template in response to a request to transmit the notification, wherein the notification comprises the parameter populated with the subset of the data, wherein the notification comprises a message, the parameter comprises a recipient, the data comprises a plurality of languages, and the subset of the data comprises a selected language for the message identified for the recipient.

\* \* \* \* \*